United States Patent
Rico Alvarino et al.

(10) Patent No.: US 11,129,188 B2
(45) Date of Patent: Sep. 21, 2021

(54) EARLY TERMINATION OF PUSCH WITH NEW UPLINK GRANT

(71) Applicant: QUALCOMM Incorporated, San Diego, CA (US)

(72) Inventors: Alberto Rico Alvarino, San Diego, CA (US); Le Liu, Fremont, CA (US); Mungal Singh Dhanda, Slough (GB); Umesh Phuyal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 167 days.

(21) Appl. No.: 16/581,004

(22) Filed: Sep. 24, 2019

(65) Prior Publication Data

US 2020/0107356 A1    Apr. 2, 2020

Related U.S. Application Data

(60) Provisional application No. 62/737,368, filed on Sep. 27, 2018.

(51) Int. Cl.
*H04W 72/14* (2009.01)
*H04W 72/12* (2009.01)
(Continued)

(52) U.S. Cl.
CPC .......... *H04W 72/14* (2013.01); *H04L 1/1819* (2013.01); *H04L 5/0055* (2013.01);
(Continued)

(58) Field of Classification Search
CPC . H04W 72/14; H04W 72/1284; H04W 80/08; H04W 72/0446; H04W 72/1268;
(Continued)

(56) References Cited

U.S. PATENT DOCUMENTS

2014/0362832 A1* 12/2014 Rudolf ............... H04L 1/1864
370/336
2017/0303248 A1* 10/2017 Chatterjee ............ H04L 1/1861
(Continued)

FOREIGN PATENT DOCUMENTS

| WO | 2017160351 A1 | 9/2017 |
| WO | 2018175446 A1 | 9/2018 |
| WO | 2019047152 A1 | 3/2019 |

OTHER PUBLICATIONS

Ericsson: "Uplink HARQ-ACK Feedback for MTC", 3GPP Draft; R2-1805179—Uplink HARQ-ACK Feedback for MTC, 3rd Generation Partnership Project (3GPP), Mobile Competence Centre ; 650, Route Des Lucioles; F-06921 Sophia-Antipolis Cedex; France, vol. RAN WG2, No. Sanya, P.R. of China; Apr. 16, 2018-Apr. 20, 2018 Apr. 14, 2018, XP051428855, Retrieved from the Internet: URL:http://www.3gpp.org/ftp/Meetings%5F3GPP%5FSYNC/RAN2/Docs/ [retrieved on Apr. 14, 2018], 4 pages.

(Continued)

*Primary Examiner* — Jung Liu
(74) *Attorney, Agent, or Firm* — Procopio, Cory, Hargreaves . . .; Nerrie M. Zohn

(57) ABSTRACT

A method for early termination of an ongoing uplink transmission based on implicit HARQ-ACK is disclosed. A wireless device may receive a first grant for a first uplink transmission and may begin repetitions of the first uplink transmission. The wireless device may receive a second grant for a second uplink transmission during the ongoing first uplink transmission. The wireless device may determine if the second grant is an implicit HARQ-ACK and may perform an early detection of the HARQ-ACK. The wireless device may terminate early the first uplink transmission based on the detection of the HARQ-ACK. Allowing the wireless device to terminate the first uplink transmission through an implicit HARQ-ACK frees up channel resources (Continued)

and saves power. The wireless device may also start the second uplink transmission earlier than a schedule time based on the early detection of the HARQ-ACK, eliminating the waste of unused uplink resources and saving power.

48 Claims, 11 Drawing Sheets

(51) Int. Cl.
*H04W 80/08* (2009.01)
*H04W 72/04* (2009.01)
*H04L 5/00* (2006.01)
*H04L 1/18* (2006.01)

(52) U.S. Cl.
CPC ... *H04W 72/0413* (2013.01); *H04W 72/0446* (2013.01); *H04W 72/1284* (2013.01); *H04W 80/08* (2013.01)

(58) Field of Classification Search
CPC ............. H04W 80/02; H04W 72/1289; H04W 72/042; H04W 72/0453; H04W 4/70; H04W 4/02; H04W 72/0413; H04L 1/1819; H04L 1/1854; H04L 5/0092; H04L 5/0044; H04L 5/0055; H04L 5/0053; H04L 1/1822; H04L 1/08; H04L 1/1864; H04L 1/1858; Y02D 30/70
See application file for complete search history.

(56) References Cited

U.S. PATENT DOCUMENTS

| | | | | |
|---|---|---|---|---|
| 2018/0152271 | A1* | 5/2018 | You | H04L 5/0019 |
| 2018/0352582 | A1* | 12/2018 | Yi | H04W 72/1257 |
| 2019/0082456 | A1* | 3/2019 | Kim | H04L 1/1854 |
| 2019/0132862 | A1 | 5/2019 | Jeon et al. | |
| 2020/0014572 | A1* | 1/2020 | Wong | H04L 1/189 |
| 2020/0092044 | A1* | 3/2020 | Park | H04W 28/04 |
| 2020/0136763 | A1* | 4/2020 | Lee | H04L 5/0007 |
| 2020/0169375 | A1* | 5/2020 | Yi | H04L 5/001 |
| 2020/0187237 | A1* | 6/2020 | Su | H04W 72/0453 |
| 2021/0037514 | A1* | 2/2021 | Yan | H04W 72/0406 |

OTHER PUBLICATIONS

International Search Report and Written Opinion—PCT/US2019/052865—ISA/EPO—dated Jan. 8, 2020.
NTT Docomo et al., "Enhanced UL Transmission with Configured Grant for URLLC", 3GPP Draft A1-1809165_URLLC Enhanced UL Grant-Free Transmissions, 3rd Generation Partnership Project 3GPP), Mobile Competence Centre; 650, Route Des Lucioles; F-06921 Sophia-Antipolis Cedex; France, vol. Ran WG1, No. Gothenburg, Sweden; Aug. 20, 2018-Aug. 24, 2018 Aug. 11, 2018, XP051516535, URL:http://www.3gpp.org/ftp/tsg%5Fran/WG1%5FRL1/TSGR1%5F94/Docs/R1%2D1809165%2Ezip [retrieved on Aug. 11, 2018], 5 pages.
ZTE: "Remaining Issues on UL HARQ-ACK Feedback for MTC", 3GPP Draft; R1-1806190 UL HARQ-ACK Feedback, 3rd Generation Partnership Project (3GPP), Mobile Competence Centre ; 650, Route Des Lucioles F-06921 Sophia-Antipolis Cedex; France, vol. RAN WG1, No. Busan, Korea; May 21, 2018-May 25, 2018 May 20, 2018, XP051441400, Retrieved from the Internet: URL:http://www.3gpp.org/ftp/Meetings%5F3GPP%5FSYNC/RAN1/Docs/ [retrieved on May 20, 2018], 5 pages.
Lenovo(Motorola Mobility): "Design of uplink HARQ-ACK feedback for efeMTC", 3GPP TSG RAN WG1 Meeting #89, R1-1707774, Hangzhou, P.R. China, May 15-19, 2017, 6 pages.
ZTE(SANECHIPS): "Further consideration on Uplink HARQ-ACK feedback in eFeMTC", 3GPP TSG-RAN WG2 Meeting#101, R2-1802162, Athens, Greece, Feb. 26-Mar. 2, 2018, pp. 1-4.

* cited by examiner

EARLY TERMINATION OF PUSCH WITH NEW UPLINK GRANT

CROSS REFERENCE TO RELATED APPLICATION(S)

This application claims the benefit of U.S. Provisional Application Ser. No. 62/737,368, entitled "EARLY TERMINATION OF PUSCH WITH NEW UPLINK GRANT" and filed on Sep. 27, 2018, which is expressly incorporated by reference herein in its entirety.

BACKGROUND

Technical Field

The present disclosure relates generally to communication systems, and more particularly, to early termination of uplink communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Transmissions of uplink data from a wireless device to a base station may be based on a wireless device receiving a resource grant to acquire uplink resources for the data transmissions. For systems such as enhanced Machine Type Communication (eMTC) or Narrowband IoT (NB_IoT) deploying 5G technology, the wireless device may transmit long repetitions (e.g., up to 128 repetitions) of uplink transmissions using the granted uplink resources. When the base station is able to decode the uplink transmission before all of the repetitions are transmitted, the base station may send reserved downlink control information (DCI) to the wireless device to terminate early the uplink transmission using an explicit physical hybrid automatic repeat request (ARQ) (HARQ) feedback. Aspects presented herein enable a UE to determine whether other information received from the base station indicates or otherwise implies that the base station has performed early decoding of the uplink transmission. For example, the base station may transmit a second resource grant to the wireless device to enable a second uplink transmission, e.g., a second set of allocated uplink resources. The wireless device may use aspects presented herein to interpret whether the second resource grant comprises implicit HARQ-ACK feedback that may be used to terminate remaining repetitions of the first uplink transmission.

As presented herein, a wireless device may determine if the second resource grant is an implicit HARQ-ACK for the first uplink transmission based on any combination of the RRC configuration received from the base station, the relationship between the timing of the first uplink transmission and the scheduled second uplink transmission, whether the second resource grant requests a retransmission of the first uplink transmission, etc. The wireless device may determine a termination time for the first uplink transmission based on the early detection of the implicit HARQ-ACK. This may enable the wireless device to terminate repetitions of the first uplink transmission using an implicit HARQ-ACK that saves the base station from having to issue an explicit HARQ-ACK feedback. Terminating the remaining scheduled repetitions of a first uplink transmission when the first uplink transmission has been received successfully frees up channel resources for other uses and reduces power consumption by the wireless device. The wireless device may also determine a start time of the second uplink transmission based on the early detection of the HARQ-ACK. The base station may configure the wireless station with multiple starting points that the wireless device may use for starting the second uplink transmission. Allowing the wireless device to start the second uplink transmission earlier than a scheduled time eliminates the waste of unused uplink resources. The base station may also save power by having to monitor the second uplink transmission only at the multiple starting points.

In an aspect of the disclosure, a method, a computer-readable medium, and an apparatus are provided. An example apparatus for wireless communication at a first UE receives a first grant for a first set of allocated uplink resources. The apparatus also transmits a first portion of a first set of repetitions of a first uplink transmission using the first set of allocated uplink resources. The apparatus also receives a second grant for a second set of allocated uplink resources. The apparatus determines whether the second grant indicates a HARQ-ACK for the first uplink transmission. In some examples, the determining of whether the second grant indicates the HARQ-ACK for the first uplink transmission is based on whether the first set of allocated uplink resources overlaps with the second set of allocated uplink resources. The apparatus also terminates transmission of a remaining portion of the first set of repetitions of the first uplink transmission after determining that the second grant indicates the HARQ-ACK for the first uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
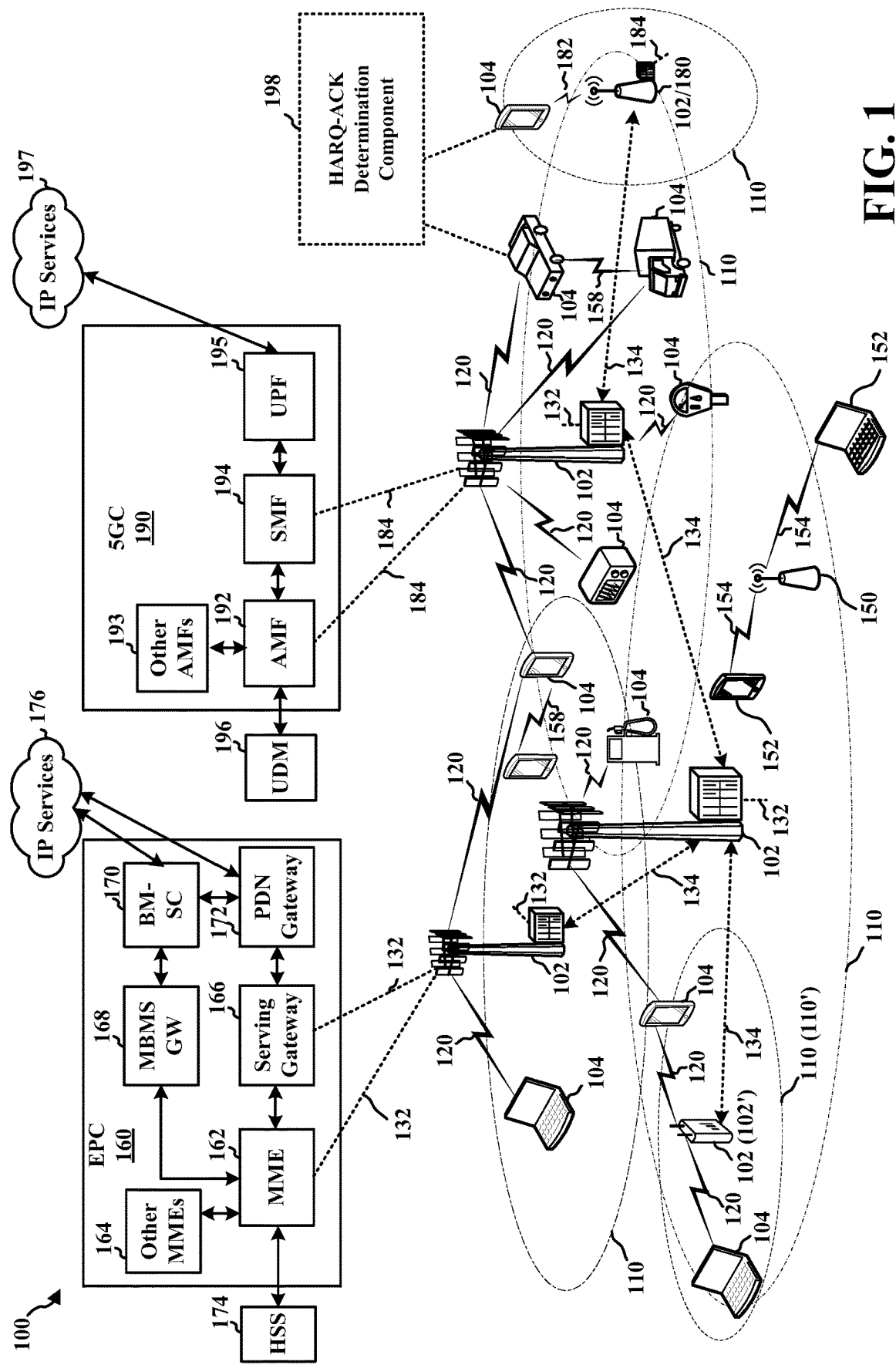
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit repetitions of a first uplink transmission. The UE 104 may receive a grant for a second uplink transmission. As an example, in FIG. 1, the UE 104 may include a HARQ-ACK determination component 198 configured to receive a first grant for a first set of allocated uplink resources. The HARQ-ACK determination component 198 may also be configured to transmit a first portion of a first set of repetitions of a first uplink transmission using the first set of allocated uplink resources. The HARQ-ACK determination component 198 may also be configured to receive a second grant for a second set of allocated uplink resources. The HARQ-ACK determination component 198 may also be configured to determine whether the second grant indicates a HARQ-ACK for the first uplink transmission. In some examples, the HARQ-ACK determination component 198 may be configured to determine whether the second grant indicates the HARQ-ACK for the first uplink transmission based on whether the first set of allocated uplink resources overlaps with the second set of allocated uplink resources. The HARQ-ACK determination component 198 may also be configured to terminate transmission of a remaining portion of the first set of repetitions of the first uplink transmission after determining that the second grant indicates the HARQ-ACK for the first uplink transmission.

For example, the UE 104 may determine if the grant for the second uplink transmission indicates an implicit HARQ-ACK for the first uplink transmission. If the grant is determined to be an implicit HARQ-ACK for the first uplink transmission, the UE 104 may determine the timing for terminating the first transmission and may terminate the remaining repetitions of the first uplink transmission based on the timing. The UE 104 may also determine the timing for starting the second uplink transmission and may start the repetitions of the second uplink transmission based on the timing.

Although the following description is focused on uplink communications, it should be appreciated that the concepts described herein may be applicable to downlink communications and/or sidelink communications. Furthermore, although the following description may be focused on 5G/NR, the concepts described herein may be applicable to other similar areas, such as LTE-LTE-A, CDMA, GSM, and/or other wireless technologies in which early termination of uplink transmissions may be employed.

Figure 2:
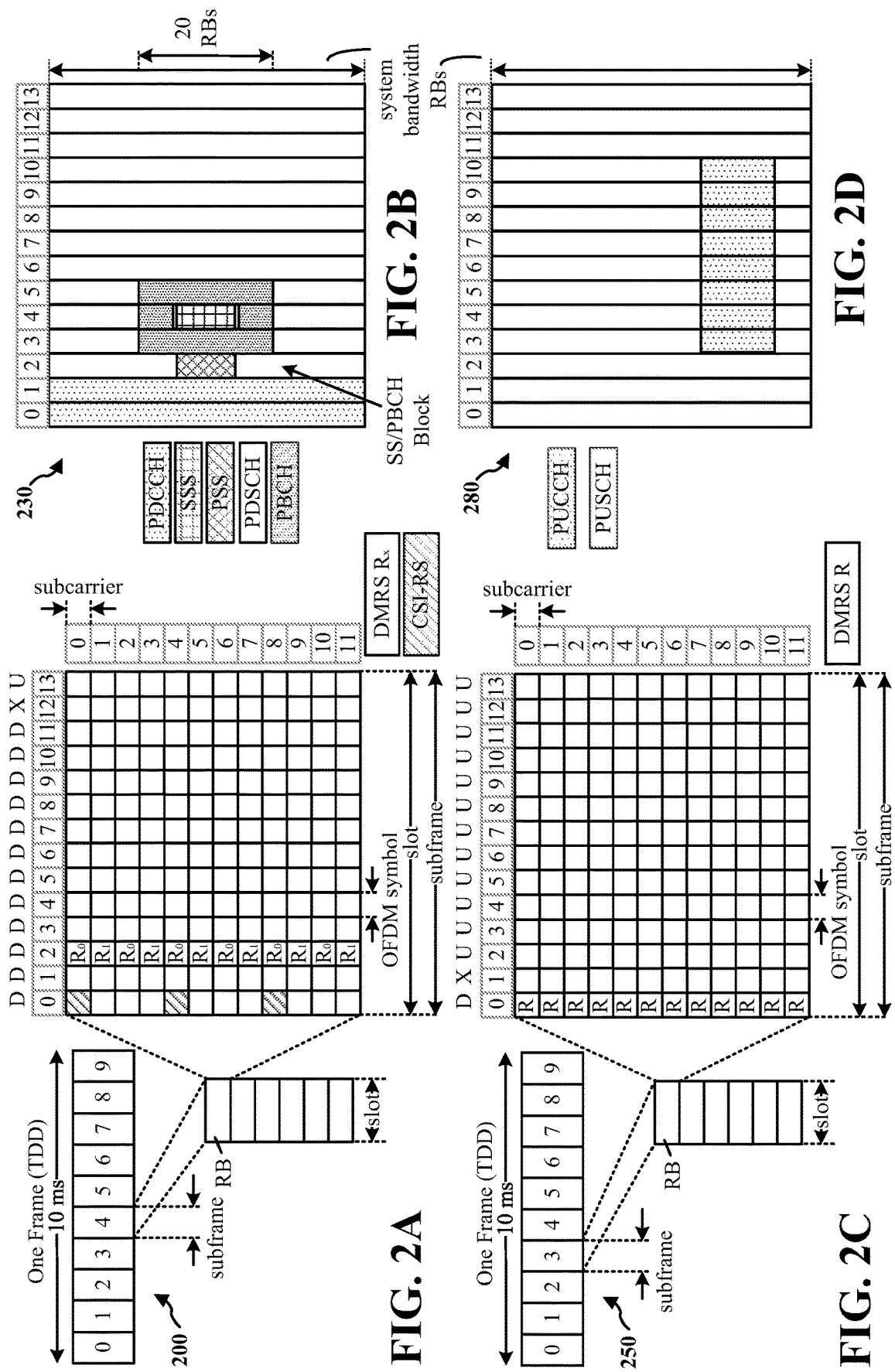
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A to 2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
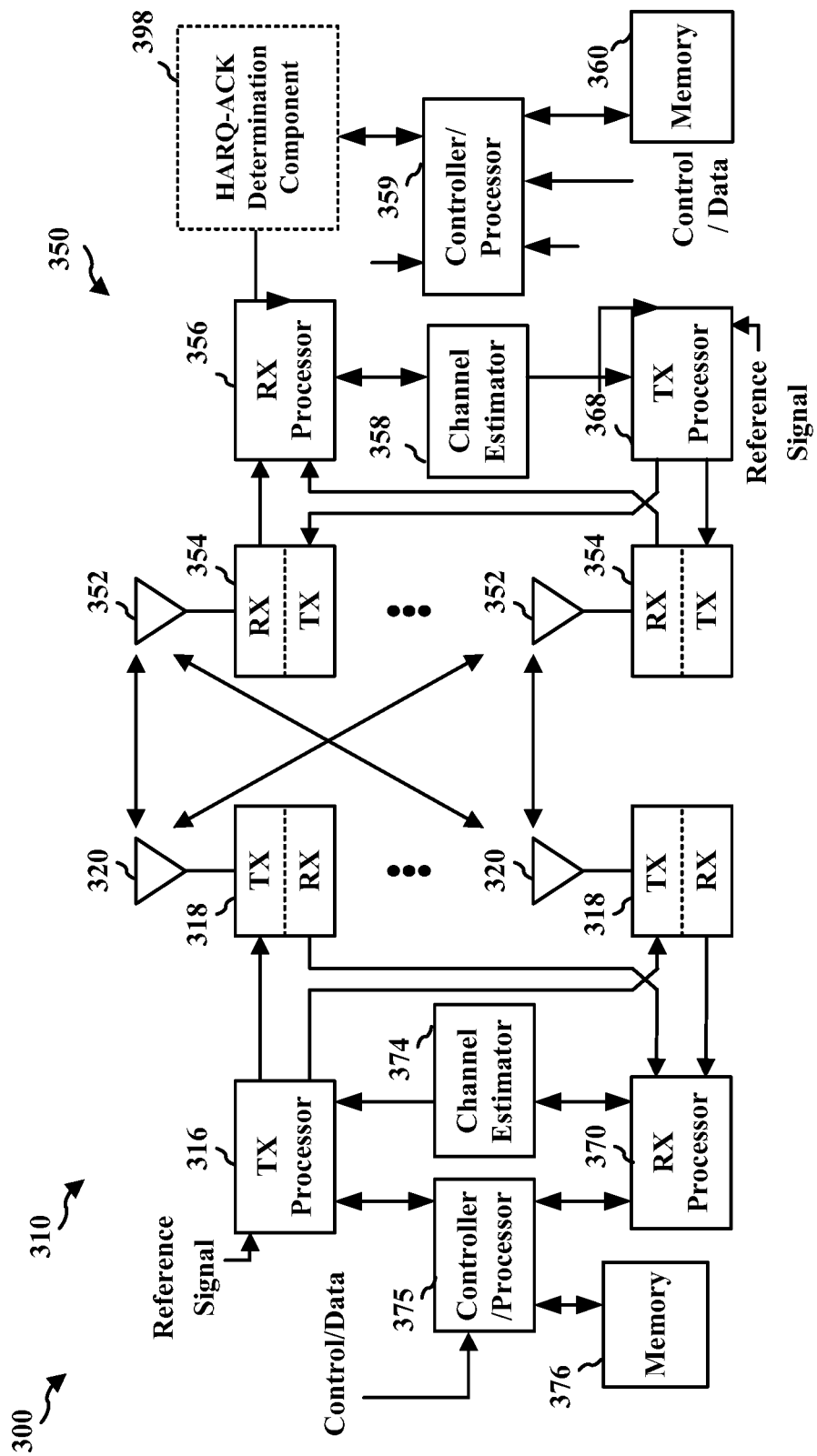
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
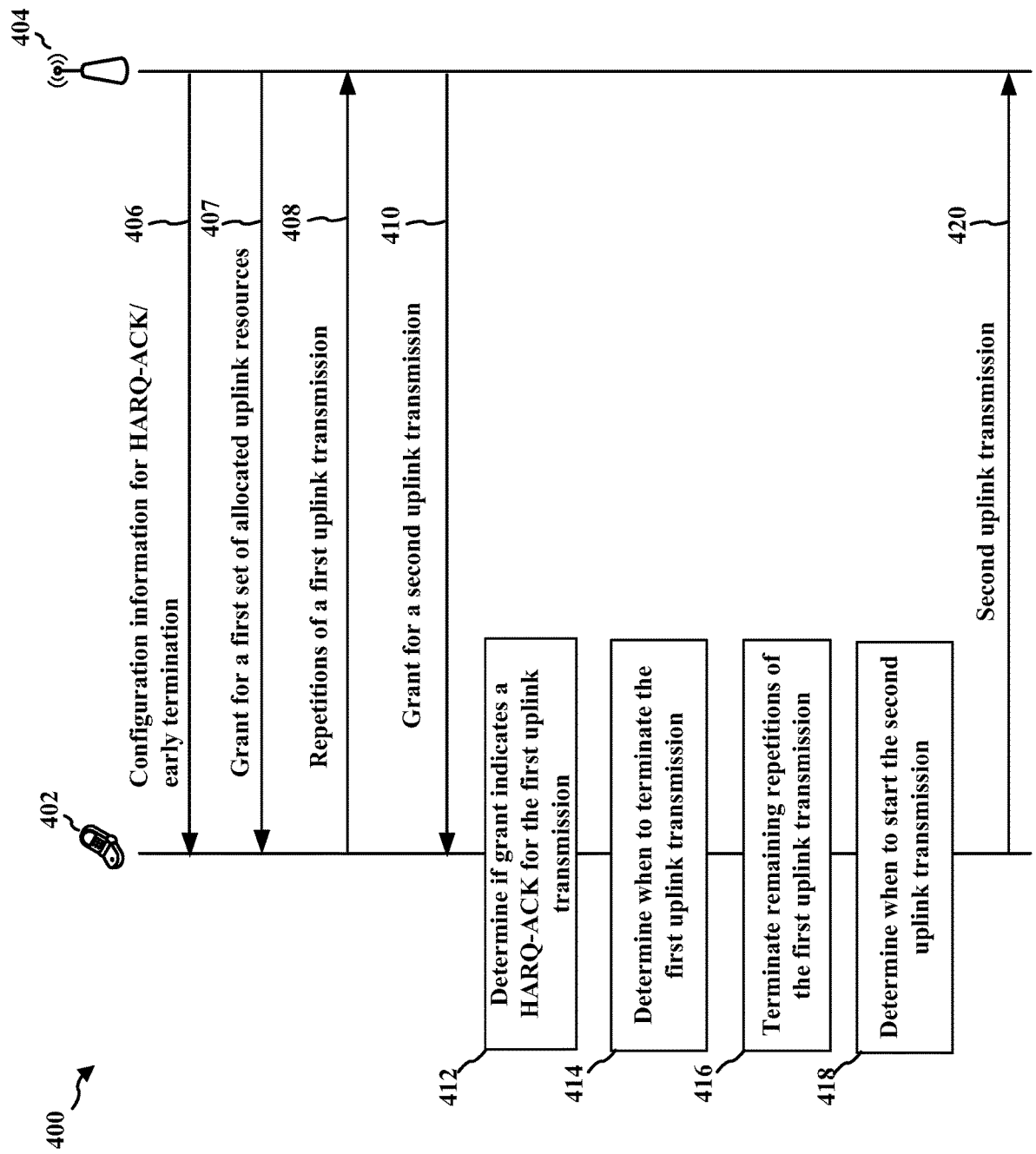
FIG. 4 is a call flow diagram illustrating an implementation of a UE receiving a grant for a second uplink transmission and decoding an implicit HARQ-ACK to terminate early a first uplink transmission in accordance with certain aspects of the disclosure.

FIG. 4 is a call flow diagram 400 for communication between a UE 402 and a base station 404. The communication may be based, e.g., on eMTC communication. FIG. 4 illustrates example aspects of an implementation of a UE 402 receiving a grant for a second uplink transmission from a base station 404 and determining whether the grant indicates an implicit HARQ-ACK for early termination of scheduled repetitions of an uplink transmission. The implicit HARQ-ACK may be used to terminate remaining repetitions a first uplink transmission in accordance with certain aspects of the disclosure. Allowing the UE 402 to terminate the first uplink transmission through an implicit HARQ-ACK saves the base station 404 from having to issue an explicit HARQ-ACK feedback. Terminating the remaining scheduled repetitions of a first uplink transmission when the first uplink transmission has been received successfully frees up channel resources for other uses and reduces power consumption by the UE 402.

The base station 404 may provide a grant 407 for a first set of uplink resources of a physical channel, e.g., a first set of allocated uplink resources of PUSCH, for an uplink transmission from the UE 402. The UE may be scheduled to transmit multiple repetitions of the uplink transmission. Thus, at 408, the UE may begin to transmit the scheduled repetitions using the first set of uplink resources of the physical channel, e.g., the first set of allocated uplink resources of the PUSCH.

At 408, the UE 402 may transmit repetitions of a first uplink transmission. The UE 402 may transmit repetitions (e.g., up to 128) of the first uplink transmission using the granted (or allocated) UL channel resources. In some examples, the UE 402 may schedule the transmitting of the repetitions of the first uplink transmission. For example, the UE 402 may schedule the transmitting of the repetitions of the first uplink transmission prior to transmitting the repetitions of the first uplink transmission.

The base station 404 may transmit a second resource grant 410 to the UE 402 for a second uplink transmission, e.g., a second set of allocated uplink resources of the PUSCH, for a second uplink transmission from the UE 402. The resource grant 410 may not contain explicit HARQ-ACK feedback such as that specified by a reserved DCI state. Instead, the UE 402 may determine if the second grant 410 implies that the base station has correctly received the first uplink transmission, e.g., prior to transmission of all of the scheduled repetitions. The UE 402 may decode the second resource grant 410 and may determine if there is an implicit HARQ-ACK feedback for the first uplink transmission. Based on the determination, the UE may further determine whether to terminate remaining scheduled repetitions of the first uplink transmission. Rather than determining that the second grant implies HARQ-ACK of the first uplink transmission 408, the UE 402 may determine that the resource grant is a request for the UE 402 to retransmit the first uplink transmission or that the second grant is made in error. The UE may determine to ignore the second grant, and repetitions of the first uplink transmission might not be terminated.

Thus, at 412, the UE 402 may determine if the second grant indicates an implicit HARQ-ACK for the ongoing first uplink transmission. The UE 402 may determine whether the second grant indicates that the base station 404 has decoded at least one repetition of the first uplink transmission. For example, the base station 404 may perform early decoding of the first uplink transmission by properly decoding the transmission prior to receiving all of the scheduled repetitions of the first uplink transmission.

The determination of the implicit HARQ-ACK by the UE 402 may depend on RRC configuration 406 received from the base station 404, the relationship between the timing of the first uplink transmission and the scheduled second uplink transmission, etc. At 406, the UE 402 may receive configuration information, e.g., an RRC parameter from the base station 404. The configuration information may configure the UE 402 to support a HARQ-ACK feedback capability and/or grant based HARQ-ACK feedback configuration. In one aspect, the UE 402 may transmit to the base station 404 an indication that the UE 402 has the capability to support implicit HARQ-ACK feedback. In one aspect, the UE capability indication may be the RRC parameter ce-UL-HARQ-ACK-Feedback-r15. The base station 404 may receive the UE capability indication from the UE 402 and may transmit RRC configuration information to the UE 402 configuring the UE 402 to support implicit HARQ-ACK feedback. In one aspect, the RRC configuration information may set the RRC information element (IE) mdpcch-UL-HARQ-ACK-FeedbackConfig-r15 of the UE 402 to true to configure the UE 402 to support implicit HARQ-ACK feedback. If the RRC information element IE is set to false, the UE 402 may not expect to receive a grant interrupting a current uplink transmission and may not interpret grant 410 to indicate that the base station has correctly received the first uplink transmission. In one aspect, if the UE 402 receives a grant scheduling a second uplink transmission that overlaps with an ongoing uplink transmission, the UE 402 may prune out the second uplink transmission, e.g., may decide to ignore the second grant and/or to continue the scheduled repetitions of the first uplink channel.

In one aspect, the UE 402 may determine if the second grant is an implicit HARQ-ACK feedback for the first uplink transmission based on whether repetitions of the first uplink transmission overlap the second uplink transmission scheduled by the second grant. For example, the UE 402 may determine whether one or more uplink resources of the first set of allocated uplink resources overlap with uplink resources of the second set of allocated uplink resources. If the second uplink transmission overlaps repetitions of the first uplink transmission, the UE 402 may determine that the second grant indicates an implicit HARQ-ACK of the first uplink transmission. Otherwise if there is no overlap, the UE 402 may determine that the second grant does not indicate a HARQ-ACK of the first uplink transmission.

In one aspect, the UE 402 may determine if the second grant is an implicit HARQ-ACK feedback for the first uplink transmission based on whether the second grant requests a retransmission of the first uplink transmission. If the second grant requests a retransmission of the first uplink transmission, then the UE 402 may determine that the second grant does not indicate the HARQ-ACK of the first uplink transmission. Otherwise, the UE may determine that the second grant indicates the HARQ-ACK of the first uplink transmission. For example, if the HARQ ID of second uplink transmission is equal to the HARQ ID of first uplink transmission, the second grant may indicate a request for a retransmission of the first uplink transmission. If a new data indicator (NDI) bit of the HARQ ID is different, this may indicate a new uplink transmission rather than a request for a retransmission, even if the remaining HARQ ID is the same between the first uplink transmission and the second uplink transmission.

In one aspect, the UE 402 may determine if the second grant is an implicit HARQ-ACK feedback for the first uplink transmission based on a spacing in time between a beginning of the first uplink transmission and the second grant or between the first grant and the second grant. For example, the UE 402 may determine that the second grant indicates the HARQ-ACK only when the second grant is received at least a minimum number, e.g., K, subframes following the beginning of the first uplink transmission and/or following receipt of the first grant. The K subframes may represent the minimum latency for the base station 404 to decode a successful reception of the first uplink transmission so as to generate an implicit HARQ-ACK. If the second grant is received in fewer than K subframes from the beginning of the first uplink transmission or from receipt of the first rang, then the UE 402 may determine that the second grant does not indicate the HARQ-ACK of the first uplink transmission.

At 414, if the UE 402 determines that the second grant implies an HARQ-ACK, the UE 402 may determine a time to terminate the remaining scheduled repetitions of the first uplink transmission. The UE 402 may be able to decode the implicit HARQ-ACK before the end of the second grant. That is, the UE 402 may perform an early decoding of the second grant. In one aspect, the UE 402 may elect to terminate the repetitions of the first uplink transmission once it has decoded the implicit HARQ-ACK. The termination may occur a period of time after decoding of the second grant, yet prior to the scheduled beginning of the second uplink transmission. The second uplink transmission may be scheduled with a relationship to or otherwise based on the end of the second grant, the UE 402 may thus terminate the repetitions of the first uplink transmission before starting the second uplink transmission. In one aspect, the UE 402 may elect to terminate the repetitions of the first uplink transmission based on the end of the second grant, even with the early decoding. As such, the UE 402 may delay terminating the repetitions of the first uplink transmission until the start of the second uplink transmission.

In one aspect, even when the UE 402 determines that the second grant indicates the HARQ-ACK of the first uplink transmission, the UE 402 may elect not to terminate the repetitions of the first uplink transmission. The UE 402 may treat the implicit HARQ-ACK as an error or as a false alarm, and may choose to ignore the second grant so as to continue the ongoing repetitions of the first uplink transmission.

At 416, the UE 402 may terminate the remaining scheduled repetitions of the first uplink transmission based on the time determined at 414.

Figure 7:
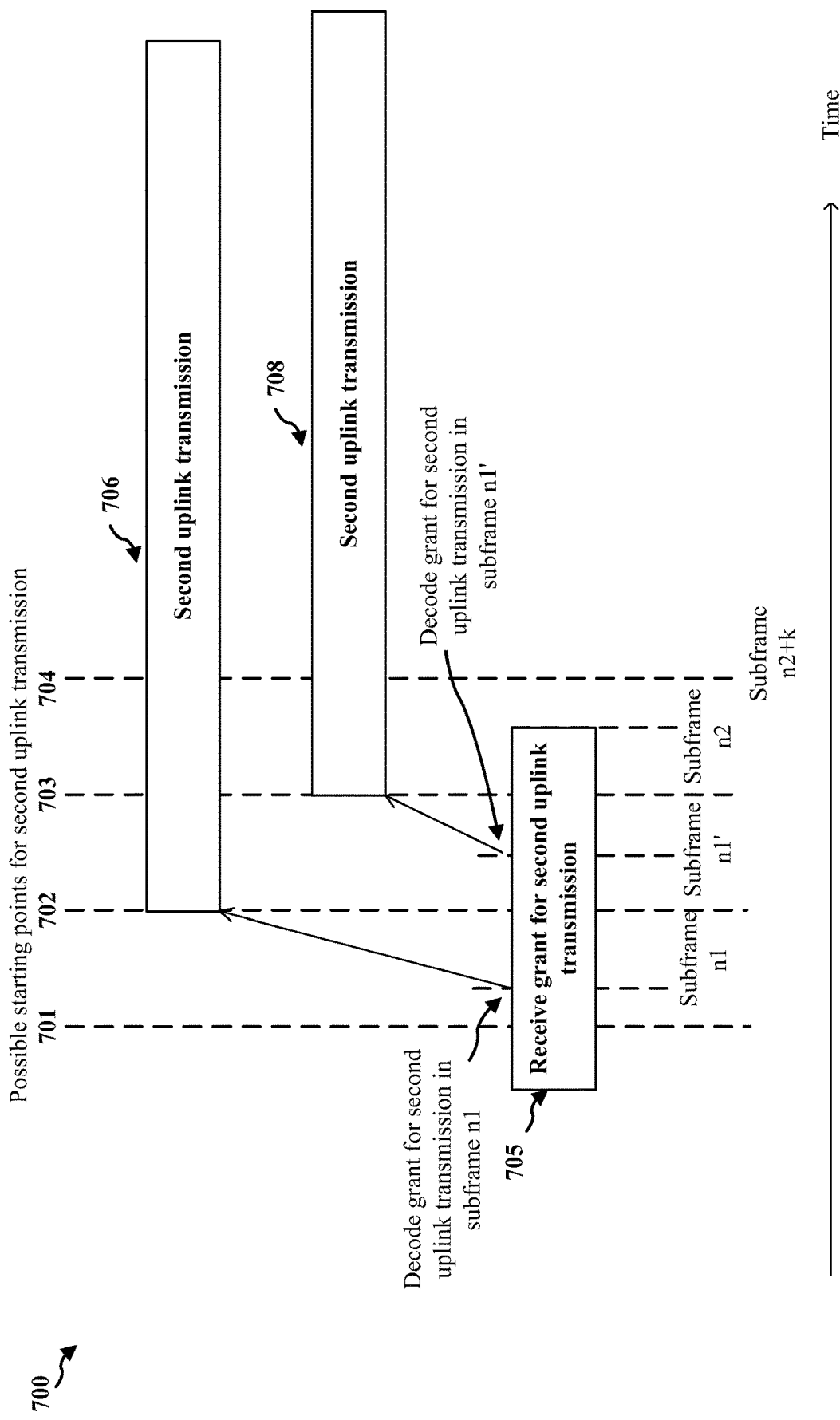
FIG. 7 is a diagram illustrating a timeline for a UE to start a second uplink transmission upon decoding an implicit HARQ-ACK in accordance with certain aspects of the disclosure.

At 418, the UE 402 may determine a time to start the second uplink transmission. In one aspect, even though the UE 402 may terminates the repetitions of the first uplink transmission after decoding the implicit HARQ-ACK, the UE 402 may elect to start the second uplink transmission based on the end of the second grant (e.g., based on the scheduled timeline). For example, the UE 402 may start the second uplink transmission a number of k subframes after the end of the second grant. The UE 402 may do this because the base station 404 may not be aware of the early decoding of the HARQ-ACK and may not be prepared to receive an early transmission of the second uplink transmission. In one aspect, the base station 404 may configure the UE 402 with multiple starting points that the UE 402 may use for starting the second uplink transmission. The base station 404 may configure the multiple starting points of the second uplink transmission using SIB, DCI, RRC, etc. Alternately, the base station 404 may fix the multiple starting points or the multiple starting points may be based on a predefined configuration. A latest starting point may be configured to be based on the end of the second grant. In one aspect, the multiple starting points may depend on a maximum repetition level of an uplink transmission or the actual repetition of the first uplink transmission or the second uplink transmission. In one aspect, the UE 402 may choose an earliest of the multiple starting points after the early decoding of the HARQ-ACK as the starting time for the second uplink transmission. FIG. 7 illustrates an example of multiple starting points.

At 420, the UE 402 may start to transmit the second uplink transmission, e.g., based on the start time determined at 418. The UE 402 may transmit repetitions (e.g., up to 128) of the second uplink transmission using the second set of allocated uplink resources of PUSCH granted by the second resource grant 410.

Additionally, the UE may provide a HARQ-ACK indication to higher layers at the UE if the second grant is determined to imply a HARQ-ACK. When a HARQ-ACK is received in the physical layer, an indication may be provided, e.g., to a MAC layer. The MAC layer may stop and/or refrain from starting at least one timer based on the indication. For example, the MAC layer may stop a retransmission timer such as a drx-ULRetransmissionTimer. Additionally, or in alternative, the MAC layer may refrain from starting a HARQ round trip time (RTT) timer, e.g., UL HARQ RTT Timer.

Figure 5:
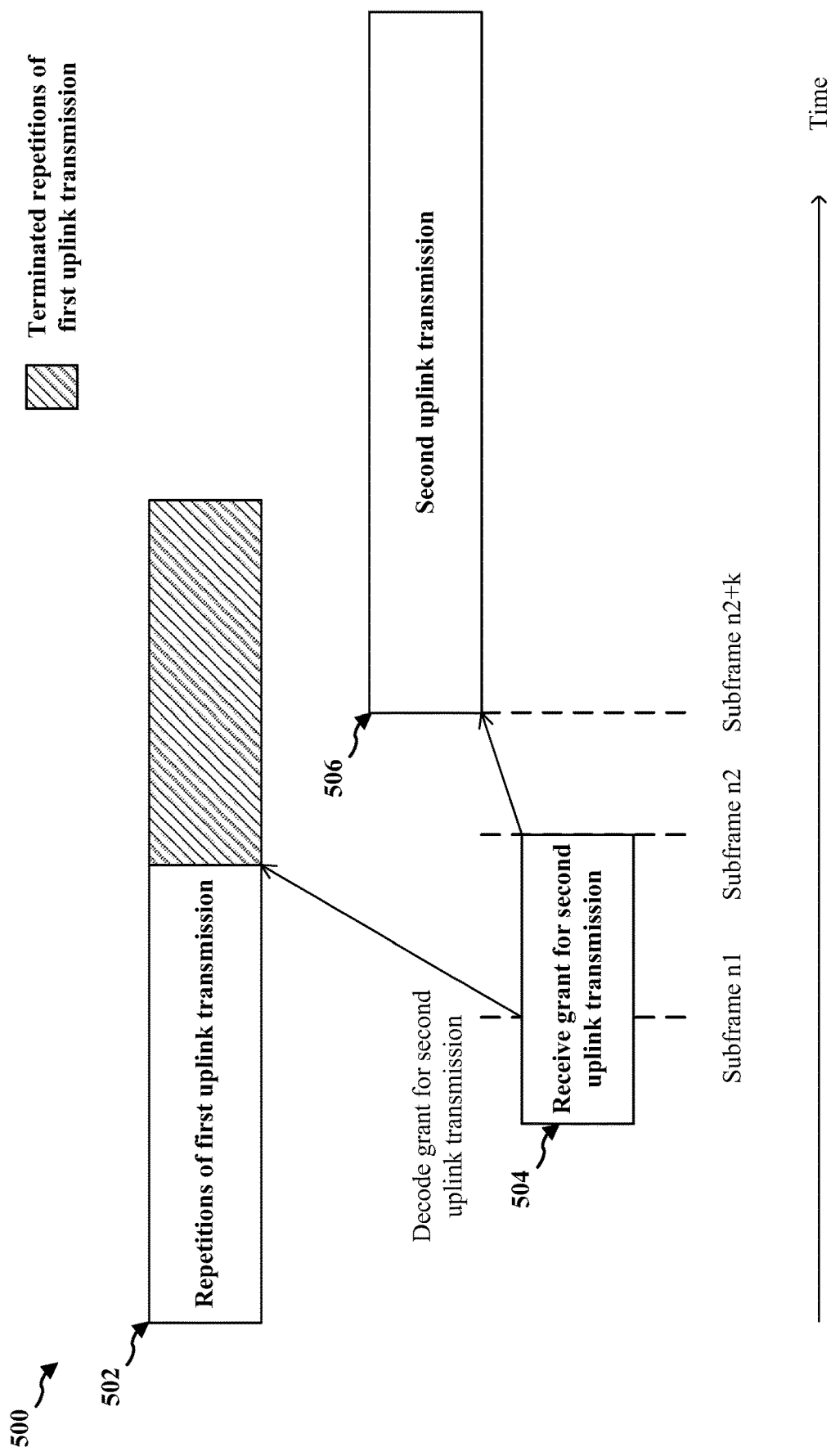
FIG. 5 is a diagram illustrating a first timeline for a UE to terminate a first uplink transmission upon decoding an implicit HARQ-ACK in accordance with certain aspects of the disclosure.

FIG. 5 is a diagram illustrating a first timeline 500 for a UE to terminate repetitions of a first uplink transmission 502 upon decoding an implicit HARQ-ACK in accordance with certain aspects of the disclosure. The UE may be UE 104, 402, 350.

The UE may receive a grant 504 for a second uplink transmission while the repetitions of the first uplink transmission are ongoing. The UE may determine that the second grant implies a HARQ-ACK of the first uplink transmission 502 at subframe n1. The UE may terminate scheduled repetitions of the first uplink transmission 502 as soon as, or some delay after, the second grant, e.g., HARQ-ACK, is decoded. Early termination of the first uplink transmission 502 saves power at the UE and also saves power at the base station because the base station no longer needs to monitor the first uplink transmission. While the repetitions of the first uplink transmission 502 are terminated early, the UE may start the second uplink transmission 506 based on the scheduled end of the grant. The end of the grant may occur at subframe n2. The start of the second uplink transmission 506 may be configured to start k subframes after the end of the grant 504, or at subframe n2+k. In FIG. 5, the repetitions of the first uplink transmission 502 may be terminated before the start of the second uplink transmission 506.

Figure 6:
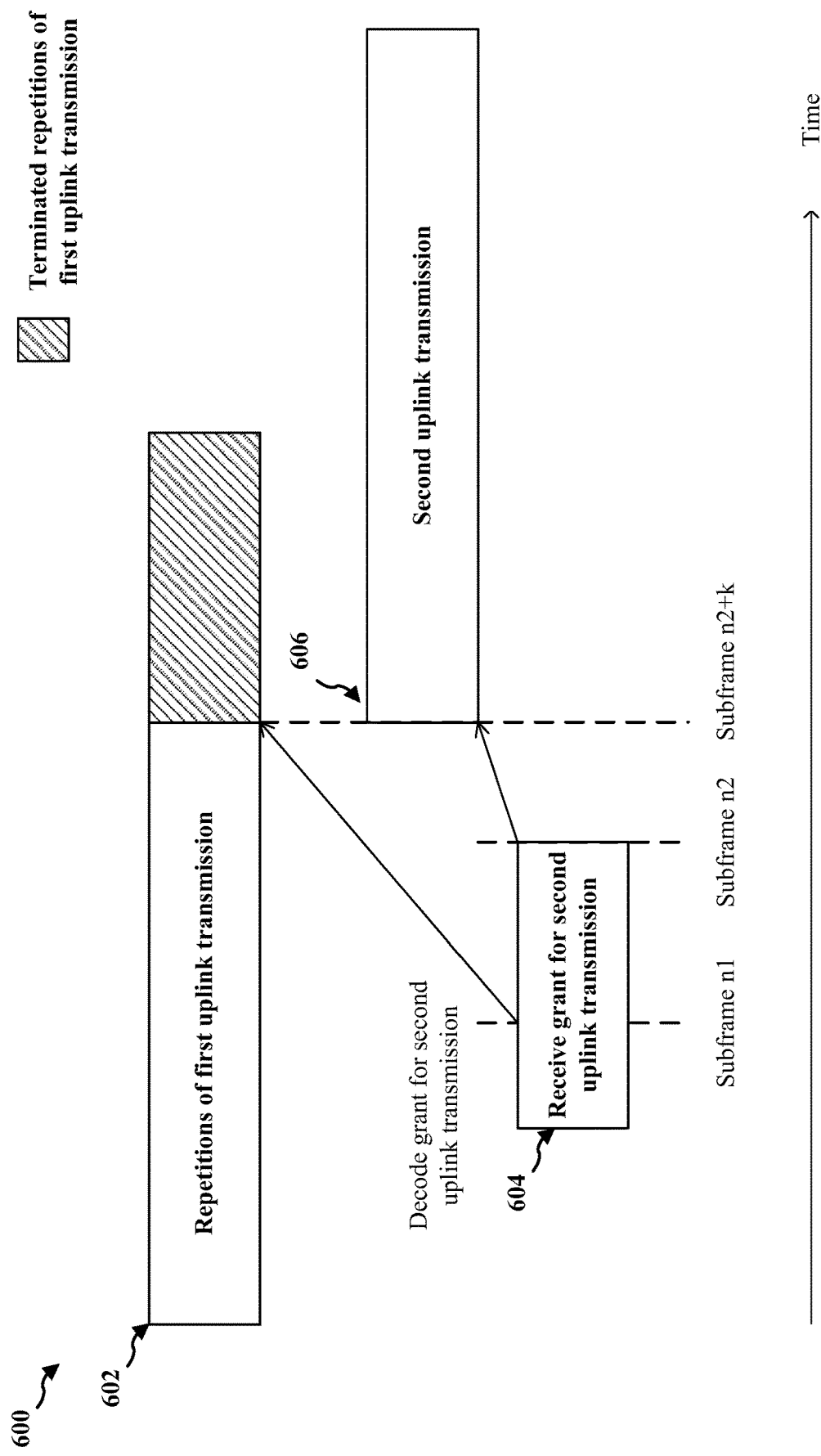
FIG. 6 is a diagram illustrating second first timeline for a UE to terminate a first uplink transmission upon decoding an implicit HARQ-ACK in accordance with certain aspects of the disclosure.

FIG. 6 is a diagram illustrating second timeline 600 for a UE to terminate a first uplink transmission 602 upon decoding a second grant and determining that the second grant indicates an implicit HARQ-ACK in accordance with certain aspects of the disclosure.

As in FIG. 5, the UE may decode the second grant and determine an implicit HARQ-ACK of the first uplink transmission 602 at subframe n1. However, the UE might not terminate the repetitions of the first uplink transmission 602 based on the early decoding of the second grant and/or the determination that the second grant implies HARQ-ACK of a first, ongoing uplink transmission. Instead, the UE may wait until the start of the second uplink transmission 606 to terminate the repetitions of the first uplink transmission 602. The termination of the first uplink transmission repetitions is configured to be k subframes after the end of the grant 604, or at subframe n2+k if the end of the grant 604 is scheduled to occur at subframe n2. In FIG. 6, the termination of the repetitions of the first uplink transmission 602 and the start of the second uplink transmission 606 are both based on the scheduled time derived from the end of the grant 604.

FIG. 7 is a diagram illustrating a timeline 700 for a UE to start a second uplink transmission upon decoding an implicit HARQ-ACK in accordance with certain aspects of the disclosure.

In FIG. 7, instead of starting the second uplink transmission at the scheduled time derived from the end of the grant 705, the base station may configure the UE with multiple starting points, or otherwise indicate multiple starting points that the UE may use for starting the second uplink transmission. For example, multiple starting points may be configured for times 701, 702, 703, and 704. In one aspect, the multiple starting points may be indicated as subframe numbers. The latest starting point, time 704, may correspond to the scheduled time derived from the end of the grant 705. For example, if the end of the grant 705 is at subframe n2, time 704 may occur at subframe n2+k. In one aspect, the base station may configure the UE with the multiple starting points using SIB, DCI, RRC signaling in the grant 705. In one aspect, the multiple starting points may be based on the maximum repetition level of an uplink transmission or the actual repetitions of the first uplink transmission or the second uplink transmission. The multiple starting points may be spaced with the same interval.

The UE may select an earliest starting point that occurs following the early HARQ-ACK detection. For example, if the UE decodes the grant 705 and determines that the second grant 705 indicates a HARQ-ACK at subframe n1, the UE may select the earliest starting time after subframe n1, e.g., starting point 702, as the starting time for the second uplink transmission 706. In another example, if the UE decodes the grant 705 to indicate a HARQ-ACK at subframe n1', the UE may select the earliest starting time after subframe n1', e.g., starting point 703, as the starting time for the second uplink transmission 708. In one aspect, the UE may terminate the ongoing repetitions of the first uplink transmission as soon as possible after the early HARQ-ACK decoding, as illustrated in FIG. 5, or no later than the start of the second uplink transmission. In one aspect, the UE may delay terminating the ongoing repetitions of the first uplink transmission until the start of the second uplink transmission, selected by the UE from the multiple starting points. Because the base station knows the multiple starting points for the second uplink transmission, the base station may monitor the second uplink transmission at the multiple starting points. Allowing the UE to start the second uplink transmission earlier than the scheduled time eliminates the waste of unused uplink resources and reduced UE power consumption. The base station may save power and/or reduce computational complexity by having to monitor the second uplink transmission only at the multiple starting points.

Figure 8:
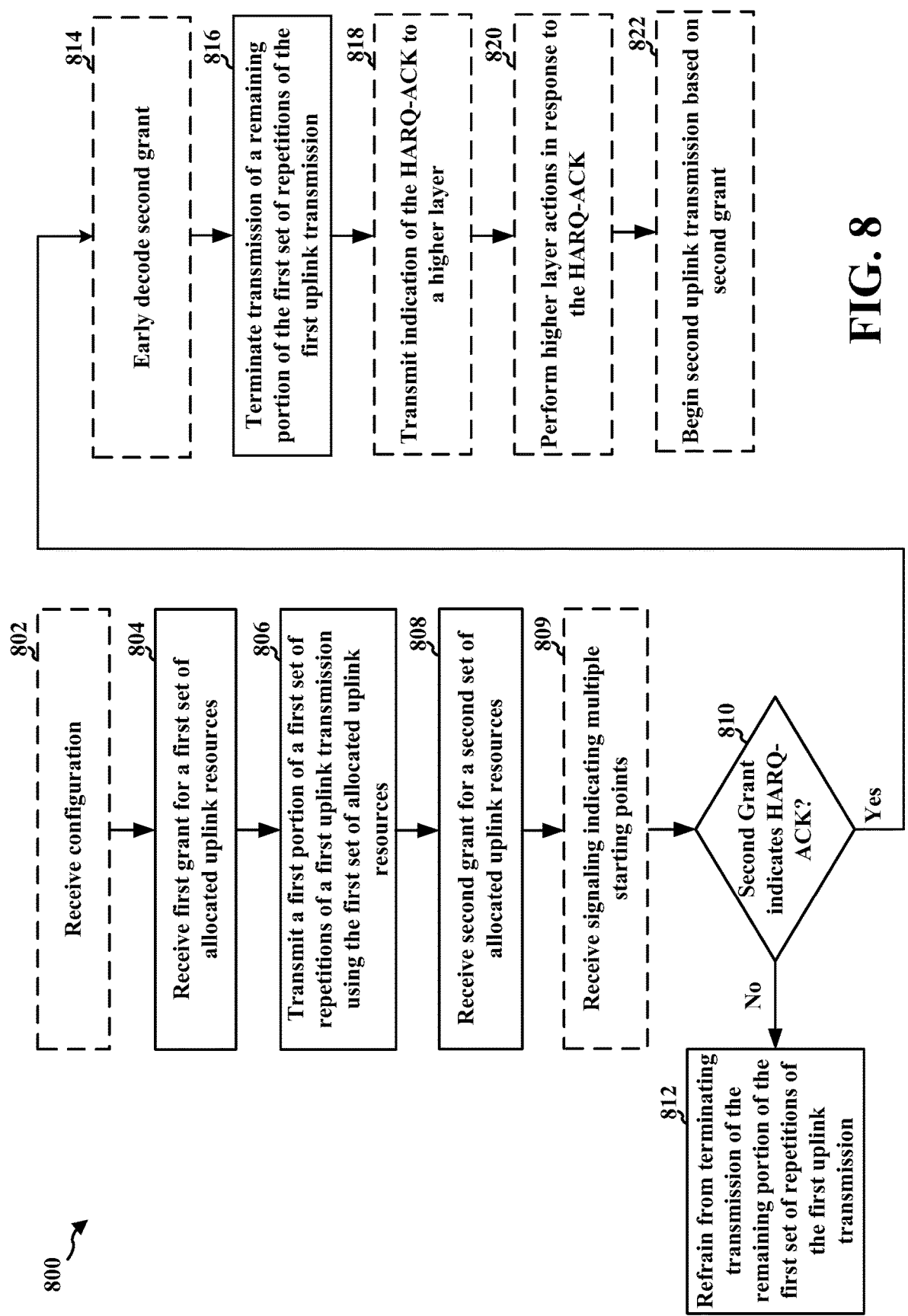
FIG. 8 is a flowchart of a method for a UE to terminate early a first uplink transmission in accordance with certain aspects of the disclosure.
Figure 9:
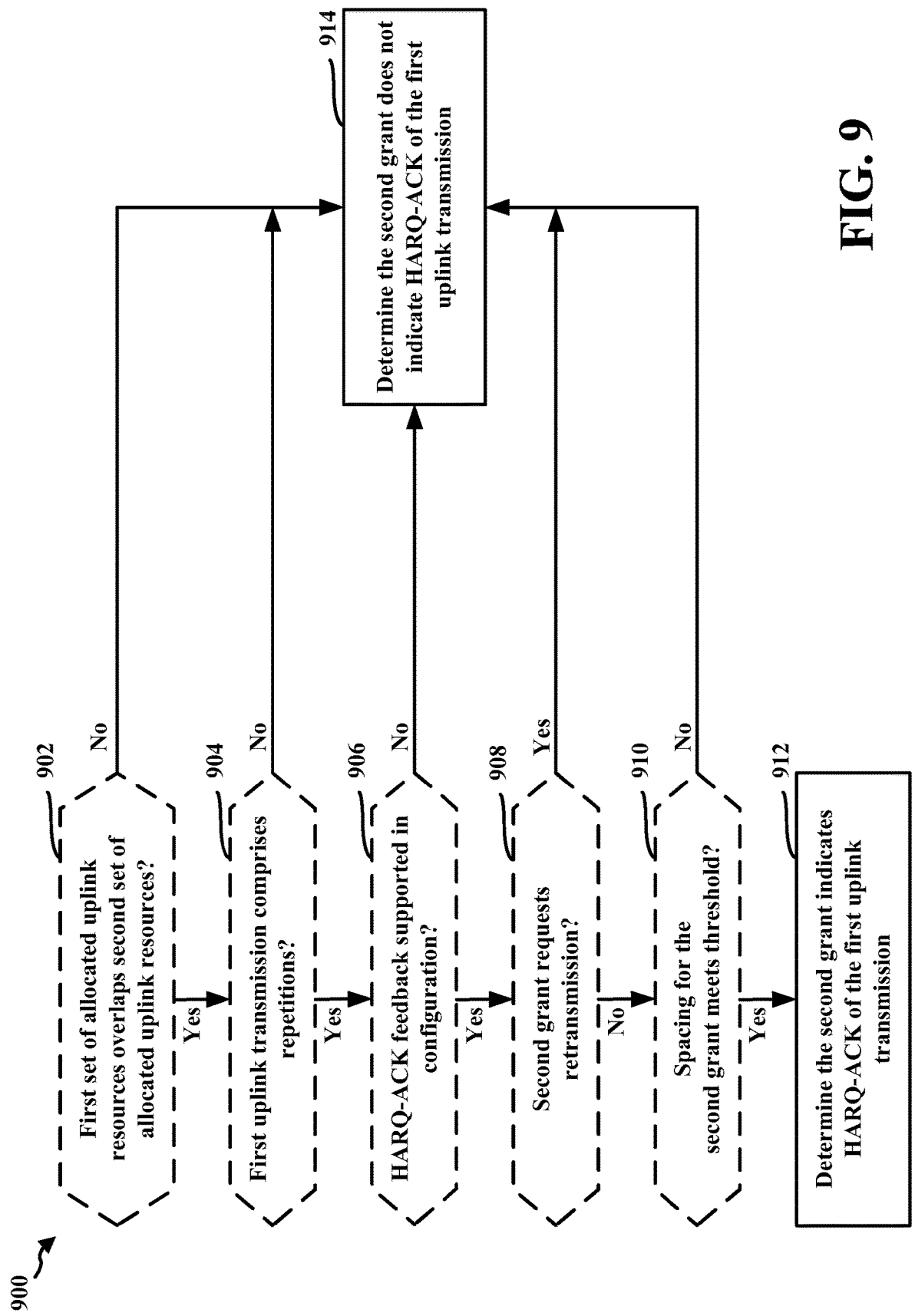
FIG. 9 is a flowchart of a method for a UE to decode an implicit HARQ-ACK to terminate a first uplink transmission in accordance with certain aspects of the disclosure.

FIGS. 8 and 9 illustrate flowcharts 800, 900 showing aspects of a method of wireless communication. FIG. 9 illustrates example aspects that may be employed in the determination performed at 810 in FIG. 8. The method may be performed by a UE or a component of a UE (e.g., UE 104, 350, 402; the apparatus 1002/1002'; the processing system 1114, which may include the memory 360 and which may be the entire UE 350 or a component of the UE 350, such as the TX processor 368, the RX processor 356, and/or the controller/processor 359). The UE may be engaged in wireless communication with a base station. In one example, the wireless communication may be based on eMTC. The aspects may also be applied to other types of wireless communication. Optional aspects are illustrated with a dashed line. The method may enable a UE to identify an implied HARQ feedback to a first transmission based on a grant for another transmission. Specifically, the method may enable the UE to distinguish between instances in which a second grant indicates an HARQ-ACK of a first transmission and other instances in which the second grant does not indicate the HARQ-ACK of the first transmission.

At 804, the UE receives a first grant for a first set of allocated uplink resources. The first set of allocated uplink resources may comprise a physical resource associated with the uplink channel. In some examples, the UE may receive a grant for PUSCH 1, e.g., 502, 602 as described in connection with FIG. 5 or FIG. 6.

At 806, the UE transmits a first portion of a first set of repetitions of a first uplink transmission using the first set of allocated uplink resources. For example, the UE may begin transmitting PUSCH 1 based on the grant for PUSCH 1. It should be appreciated that in some examples, the UE may schedule the transmission of the first set of repetitions of the first uplink transmission. For example, the UE may schedule the transmission of the first set of repetitions prior to transmitting the first portion of the first set of repetitions.

At 808, the UE may receive a second grant for a second set of allocated uplink resources, e.g., a second physical resource associated with the uplink channel. For example, after receiving the grant for PUSCH 1, the UE may receive a grant for PUSCH 2, e.g., 506, 606 as described in connection with FIG. 5 or FIG. 6. The second grant may be received prior to transmission of all of the scheduled repetitions of the first uplink transmission.

Thus, at 810, the UE may determine whether the second grant indicates a HARQ-ACK for the first uplink transmission. For example, the UE may determine whether the grant for PUSCH 2 indicates that the base station has early decoded the PUSCH 1. The base station may perform early decoding of the PUSCH 1 by properly decoding the transmission prior to receiving all of the scheduled repetitions for the PUSCH 1. The determination may be based on any combination of the example aspects described in connection with FIG. 9.

In some examples, if the UE determines, at 810, that the second grant does not indicate the HARQ-ACK for the first uplink transmission, the UE may refrain from terminating transmission of the remaining portion of the first set of repetitions of the first uplink transmission, at 812. For example, the UE may determine to ignore the second grant, e.g., treating the second grant as an error or whether to process the grant and stop the PUSCH 1 transmission. Thus, the UE may continue to transmit the scheduled repetitions of the PUSCH 1 until the scheduled repetitions of the PUSCH 1 transmission are completed, e.g., until all of the scheduled repetitions have been transmitted. In some examples, the UE may consider the grant an invalid grant and disregard the second grant for PUSCH 2. It should be appreciated that in some examples, the remaining portion of the first set of repetitions may be located after the determining that the second grant indicates the HARQ-ACK for the first uplink transmission and that the first set of allocated uplink resources overlaps with the second set of allocated uplink resources.

In some examples, if the UE determines, at 810, that the second grant does indicate the HARQ-ACK for the first uplink transmission, the UE may terminate transmission of the remaining portion of the first set of repetitions of the first uplink transmission, at 816, such that the UE does not transmit all scheduled repetitions of the first uplink transmission. Thus, the UE may perform an early termination of a PUSCH 1 transmission if the UE determines that a grant for PUSCH 2 indicates that the base station has performed an early decoding of the PUSCH 1 transmission.

Thus, the UE may adjust at least one of the first uplink transmission corresponding to the first grant or a second uplink transmission corresponding to the second grant based on the determining, at 810, whether the second grant indicates the HARQ-ACK for the first uplink transmission. As illustrated, the UE may determine to refrain from terminating transmission of the remaining portion of the first set of repetitions of the first uplink transmission, at 812, when the second grant is determined to not indicate HARQ-ACK for the first uplink transmission. The UE may also determine to refrain from terminating transmission of the remaining portion of the first set of repetitions of the first uplink transmission, at 816, when the opposite determination is made at 810.

The determination at 810 may be based on any of a number of various factors. FIG. 9 illustrates an example 900 illustrating possible considerations upon which the determination 810 may be based. As illustrated at 902, the UE may determine whether the second grant indicates the HARQ-ACK for the first uplink transmission based on whether the first set of allocated uplink resources overlaps with the second set of allocated uplink resources in time. If the second set of allocated uplink resources overlaps with the first set of allocated uplink resources in time, then the UE may determine, at 912, that the second grant indicates the HARQ-ACK of the first uplink transmission. If the second set of allocated uplink resources does not overlap with the first set of allocated uplink resources in time, then the UE may determine, at 914, that the second grant does not indicate the HARQ-ACK of the first uplink transmission.

In another example, the UE may determine whether the second grant indicates the HARQ-ACK for the first uplink transmission based on whether the second grant requests a retransmission of the first uplink transmission, as illustrated at 908. If the second grant requests a retransmission of the first uplink transmission, then the UE may determine, at 914, that the second grant does not indicate the HARQ-ACK of the first uplink transmission. If the second grant does not request a retransmission of the first uplink transmission, then the UE may determine, at 912, that the second grant indicates the HARQ-ACK of the first uplink transmission. The determination may be based on a first HARQ ID of the first uplink transmission and a second HARQ ID of the second transmission, a first new data indicator of the first uplink transmission and a second new data indicator of the second uplink transmission. For example, if the HARQ ID of PUSCH2 is equal to the HARQ ID of PUSCH 1, the second grant may indicate a request for a retransmission of PUSCH 1. If a new data indication (NDI) bit of the HARQ ID is different, this may indicate a new PUSCH transmission rather than a request for a retransmission, even if the remaining HARQ ID is the same between PUSCH 1 and PUSCH 2.

In another example, the UE may determine whether the second grant indicates the HARQ-ACK for the first uplink transmission based on a spacing in time between a beginning of the first uplink transmission and the second grant or a spacing in time between the first grant and the second grant, as illustrated at 910. For example, the UE may determine that the second grant indicates the HARQ-ACK when the second grant is received at least a minimum number, e.g., K, subframes following the first grant and/or following the beginning of the first uplink transmission. If the second grant is received at least K subframes following the first grant or the beginning of PUSCH 1, the UE may determine, at 912, that the second grant indicates the HARQ-ACK of the first uplink transmission. If the second grant is received in fewer than K subframes, then the UE may determine, at 914, that the second grant does not indicate the HARQ-ACK of the first uplink transmission.

As illustrated at 802, the UE may receive a configuration, e.g., an RRC configuration, indicating whether uplink HARQ-ACK feedback is supported. In one example, the UE may determine whether the second grant indicates the HARQ-ACK for the first uplink transmission further based on the configuration, e.g., as illustrated at 906. Thus, if the configuration indicates that uplink HARQ-ACK feedback is supported, the second grant may be determined to indicate the HARQ-ACK for the first uplink transmission, at 912. If the configuration indicates that uplink HARQ-ACK feedback is not supported, the second grant may be determined, at 914, to not indicate the HARQ-ACK for the first uplink transmission.

In another example, the UE may determine whether the second grant indicates the HARQ-ACK for the first uplink transmission based on whether the first uplink transmission comprises repetitions, e.g., as illustrated at 904. If the first uplink transmission does comprise repetitions, the second grant may be determined to indicate the HARQ-ACK for the first uplink transmission, at 912. If the first uplink transmission does not comprise repetitions, the second grant may be determined, at 914, to not indicate the HARQ-ACK for the first uplink transmission.

When the UE determines, at 810, that the second grant indicates the HARQ-ACK for the first uplink transmission, the UE may end the first uplink transmission, at 816, prior to transmitting all scheduled repetitions of the first uplink transmission in response to determining that the second grant indicates the HARQ-ACK for the first uplink transmission. For example, the UE may terminate transmissions of any remaining repetitions of the first uplink transmission in response to determining that the second grant indicates the HARQ-ACK for the first uplink transmission.

The UE may decode the second grant, at 814, prior to receiving the full second grant, and may terminate the repetitions of the first uplink transmission, at 816, before the start of the second uplink transmission, e.g., based on a time at which the second grant is decoded. Thus, similar to a base station performing early decoding of a PUSCH 1, the UE may similarly perform an early decoding of the second grant. When early decoding of the second grant occurs, the UE may end the repetitions of the PUSCH 1 transmission after receiving the second grant and prior to beginning the PUSCH 2 transmission, e.g., rather than waiting until the beginning of the PUSCH 2 transmission. In some examples, the UE may end the PUSCH 1 transmission a certain amount of time, e.g., a certain number of subframes, after decoding the second grant. FIG. 5 illustrates an example in which the repetitions of the first uplink transmission 502 are terminated based on early decoding of the second grant 504.

As illustrated at 822, the UE may transmit a second uplink transmission according to the second grant using a starting point based on the end point of the second grant. Thus, while PUSCH 1 may be ended based on the early decoding of the second grant, the UE may continue to use the scheduled end of the second grant to begin the PUSCH 2 transmission, e.g., such as illustrated in the example in FIG. 5. While the UE may perform an early decoding and the HARQ-ACK may indicate that the base station does not require ongoing transmission of PUSCH 1, the UE has not communicated the early decoding of the second grant to the base station. Thus, the base station will not be prepared to receive an early transmission of the PUSCH 2.

In another example, the UE may transmit the second uplink transmission, at 822, according to the second grant using a starting point selected from a set of multiple starting points. Example aspects are described in connection with FIG. 7. As the base station is to be ready to receive the communication from the UE, the UE may use starting points based on information provided by the base station or known to the base station. For example, at 809, the UE may receive signaling indicating the set of multiple starting points. The signaling may comprise at least one of system information, downlink control information, or radio resource control. The starting points may be specified or based on a predefined set of starting points. The set of multiple starting points may depend on at least one of a maximum repetition level of the second grant or an actual repetition level of the second grant.

When the UE determines that the second grant indicates the HARQ-ACK for the first uplink transmission, at 810, the UE may send an indication of the HARQ-ACK from a physical layer to a higher layer upon determining the second grant indicates the HARQ-ACK for the first uplink transmission, as illustrated at 818. The indication, at 818, may inform the higher layers to perform actions, at 820, based on the HARQ-ACK. For example, the physical layer may provide an indication of the HARQ-ACK to a MAC layer. In response, the MAC layer may stop a retransmission timer, e.g., a drx-ULRetransmissionTimer. The MAC layer may refrain from starting a second timer, e.g., an UL HARQ RTT timer. In some examples, a DRX active time may be based on all of the subframes of the first uplink transmission. In some examples, the UE may perform the higher layer actions, at 820, in response to the indication of the HARQ-ACK of the first uplink transmission based on the time at which the second grant is decoded. In some examples, the UE may perform the higher layer actions, at 820, in response to the indication of the HARQ-ACK of the first uplink transmission based on the end point of the second grant. In some examples, the UE may perform the higher layer actions, at 820, in response to the indication of the HARQ-ACK of the first uplink transmission based on a starting point of the second uplink transmission.

Figure 10:
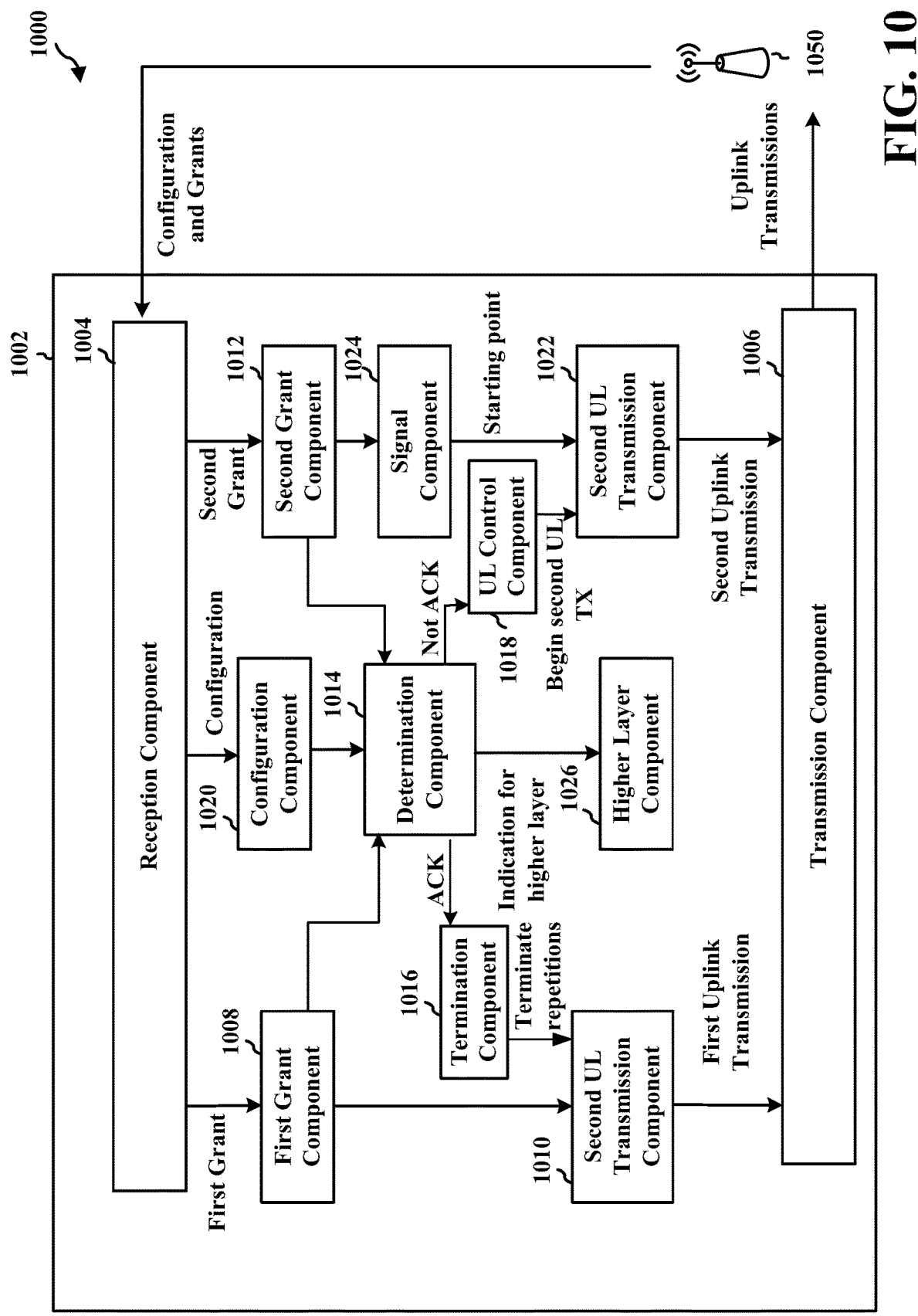
FIG. 10 is a conceptual data flow diagram illustrating the data flow between different means/components in an example apparatus of a UE in accordance with certain aspects of the disclosure.

FIG. 10 is a conceptual data flow diagram 1000 illustrating the data flow between different means/components in an exemplary apparatus 1002. The apparatus may be a UE (e.g., UE 104, 350, 402) engaged in communication with a base station (e.g., base station 102, 180, 310, 404, 1050). The apparatus includes a reception component 1004 that receives downlink communication from the base station and a transmission component 1006 that transmits uplink communication to the base station. The communication may be based on eMTC, in one example.

The apparatus may include a first grant component 1008 configured to receive a first grant for a first set of allocated uplink resources. The apparatus may include a first UL transmission component 1010 configured to transmit a first portion of a first set of repetitions of a first uplink transmission, e.g., via transmission component 1006, using the first set of allocated uplink resources. In some examples, the first UL transmission component 1010 may be configured to schedule the transmission of the first set of repetitions of the first uplink grant. The apparatus may include a second grant component 1012 configured to receive a second grant for a second set of allocated uplink resources and a determination component 1014 configured to determine whether the second grant indicates a HARQ-ACK for the first uplink transmission. The determination component 1014 may determine whether the second grant indicates the HARQ-ACK for the first uplink transmission based on any combination of the examples described in connection with FIGS. 8 and 9.

The apparatus may include a termination component 1016 configured to terminate transmission of a remaining portion of the first set of repetitions of the first uplink transmission after the second grant is determined to indicate the HARQ-ACK for the first uplink transmission and/or a second UL control component 1018 configured to, or to determine when to, start transmitting the second uplink transmission earlier than a scheduled time based on the end of the second grant when the second grant is determined to indicate the HARQ-ACK for the first uplink transmission, as illustrated in FIG. 7. The second grant component 1012 may decode the second grant prior to an end point of the second grant.

The apparatus may include a configuration component 1020 configured to receive a configuration, wherein the UE determines whether the second grant indicates the HARQ-ACK for the first uplink transmission further based on the configuration. For example, if the configuration, received by the configuration component 1020 indicates that the uplink HARQ-ACK feedback is supported, the second grant may be determined to indicate the HARQ-ACK for the first uplink transmission. In some examples, if the configuration indicates that the uplink HARQ-ACK feedback is not supported, the second grant may be determined to not indicate the HARQ-ACK for the first uplink transmission.

The apparatus may include a second UL transmission component 1022 configured to transmit, e.g., via the transmission component 1006, a second uplink transmission according to the second grant, e.g., using a starting point based on the end point of the second grant and/or using a starting point selected from a set of multiple starting points. The apparatus may include a signal component 1024 configured to receive signaling indicating the set of multiple starting points. In some examples, the signaling may comprise at least one of system information, downlink control information, or radio resource control.

The apparatus may include a higher layer component 1026 configured to send an indication of the HARQ-ACK from a physical layer to a higher layer upon determining the second grant indicates the HARQ-ACK for the first uplink transmission. The higher layer component 1026 may also perform higher layer actions in response to the indication of the HARQ-ACK of the first uplink transmission, e.g., based on the time at which the second grant is decoded, based on the end point of the second grant, and/or based on a starting point of the second uplink transmission.

The apparatus may include additional components that perform each of the blocks of the algorithm in the aforementioned flowcharts of FIGS. 4, 8 and 9. As such, each block in the aforementioned flowcharts of FIGS. 4, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
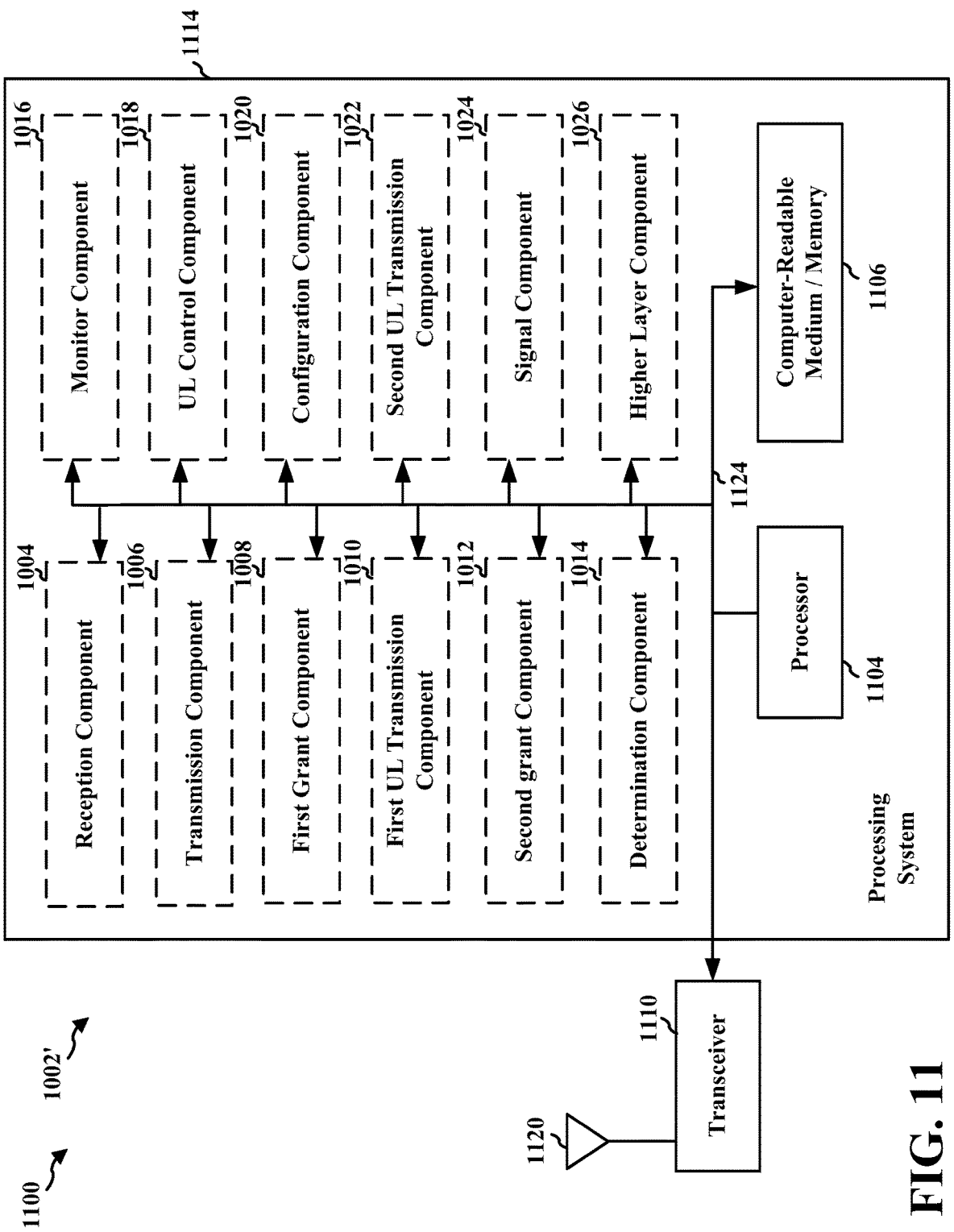
FIG. 11 is a diagram illustrating an example of a hardware implementation for an apparatus of a UE employing a processing system in accordance with certain aspects of the disclosure.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, 1022, 1024, 1026, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020, 1022, 1024, 1026. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see the UE 350 of FIG. 3).

In one configuration, the apparatus 1002/1002' for wireless communication includes means for receiving a first grant for a first set of allocated uplink resources. The apparatus may include means for transmitting a first portion of a first set of repetitions of a first uplink transmission using the first set of allocated uplink resources. The apparatus may include means for receiving a second grant for a second set of allocated uplink resources. The apparatus may include means for determining whether the second grant indicates a HARQ-ACK for the first uplink transmission, and where the apparatus determines whether the second grant indicates the HARQ-ACK for the first uplink transmission based on whether the first set of allocated uplink resources overlaps with the second set of allocated uplink resources in time. The apparatus may include means for terminating transmission of a remaining portion of the first set of repetitions of the first uplink transmission after determining that the second grant indicates the HARQ-ACK for the first uplink transmission. The apparatus may include means for refraining from terminating transmission of the remaining portion of the first set of repetitions of the first uplink transmission when the second grant is determined to not indicate the HARQ-ACK for the first uplink transmission. The apparatus may include means for receiving a configuration, and where the apparatus determines whether the second grant indicates the HARQ-ACK for the first uplink transmission further based on the configuration. The apparatus may include means for terminating remaining repetitions of the first set of repetitions of the first uplink transmission in response to determining that the second grant indicates the HARQ-ACK for the first uplink transmission. The apparatus may include means for transmitting a second uplink transmission according to the second grant using a starting point based on an end point of the second grant. The apparatus may include means for transmitting a second uplink transmission according to the second grant using a starting point selected from a set of multiple starting point. The apparatus may include means for receiving signaling indicating the set of multiple starting points, and where the signaling comprises at least one of system information, downlink control information, or radio resource control. The apparatus may include means for sending an indication of the HARQ-ACK from a physical layer to a higher layer upon determining the second grant indicates the HARQ-ACK for the first uplink transmission. The apparatus may include means for scheduling transmission of the first set of repetitions of the first uplink transmission.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a UE, comprising: receiving a first grant for a first set of allocated uplink resources; transmitting a first portion of a first set of repetitions of a first uplink transmission using the first set of allocated uplink resources; receiving a second grant for a second set of allocated uplink resources; determining whether the second grant indicates a Hybrid Automatic Repeat Request (HARQ) Acknowledgement (ACK) for the first uplink transmission, wherein the determining of whether the second grant indicates the HARQ-ACK for the first uplink transmission is based on whether the first set of allocated uplink resources overlaps with the second set of allocated uplink resources; and terminating transmission of a remaining portion of the first set of repetitions of the first uplink transmission after determining that the second grant indicates the HARQ-ACK for the first uplink transmission.

In Example 2, the method of Example 1 further includes that the determining of whether the second grant indicates the HARQ-ACK for the first uplink transmission is further based on whether the second grant is a retransmission request of the first uplink transmission.

In Example 3, the method of any of Example 1 or Example 2 further includes that the determining of whether the second grant is the retransmission request of the first uplink transmission is based on at least one of a first HARQ identifier (ID) of the first uplink transmission and a second HARQ ID of a second uplink transmission, or a first new data indicator of the first uplink transmission and a second new data indicator of the second uplink transmission.

In Example 4, the method of any of Example 1 to Example 3 further includes that the determining of whether the second grant indicates the HARQ-ACK for the first uplink transmission is further based on at least one of a spacing in time between a beginning of the first uplink transmission and the second grant, or a spacing in time between the first grant and the second grant.

In Example 5, the method of any of Example 1 to Example 4 further includes that the determining of whether the second grant indicates the HARQ-ACK for the first uplink transmission is further based on whether the first set of allocated uplink resources overlaps with the second set of allocated uplink resources in time.

In Example 6, the method of any of Example 1 to Example 5 further includes: receiving a configuration, and where the determining of whether the second grant indicates the HARQ-ACK for the first uplink transmission is further based on the configuration.

In Example 7, the method of any of Example 1 to Example 6 further includes that the configuration comprises an indication of whether uplink HARQ-ACK feedback is supported.

In Example 8, the method of any of Example 1 to Example 7 further includes that the second grant is determined to indicate the HARQ-ACK for the first uplink transmission when the configuration indicates that the uplink HARQ-ACK feedback is supported, and wherein the second grant is determined to not indicate the HARQ-ACK for the first uplink transmission when the configuration indicates that the uplink HARQ-ACK feedback is not supported.

In Example 9, the method of any of Example 1 to Example 8 further includes: terminating remaining repetitions of the first set of repetitions of the first uplink transmission in response to determining that the second grant indicates the HARQ-ACK for the first uplink transmission.

In Example 10, the method of any of Example 1 to Example 9 further includes that transmission of the first set of repetitions ends before a start of a second uplink transmission.

In Example 11, the method of any of Example 1 to Example 10 further includes: transmitting a second uplink transmission according to the second grant using a starting point based on an end point of the second grant.

In Example 12, the method of any of Example 1 to Example 11 further includes: transmitting a second uplink transmission according to the second grant using a starting point selected from a set of multiple starting points.

In Example 13, the method of any of Example 1 to Example 12 further includes: receiving signaling indicating the set of multiple starting points, wherein the signaling comprises at least one of system information, downlink control information, or radio resource control.

In Example 14, the method of any of Example 1 to Example 13 further includes that the set of multiple starting points is based on a predefined set of starting points.

In Example 15, the method of any of Example 1 to Example 14 further includes that the set of multiple starting points depends on at least one of a maximum repetition level of the second grant or an actual repetition level of the second grant.

In Example 16, the method of any of Example 1 to Example 15 further includes: sending an indication of the HARQ-ACK from a physical layer to a higher layer upon determining the second grant indicates the HARQ-ACK for the first uplink transmission.

In Example 17, the method of any of Example 1 to Example 16 further includes: refraining from terminating transmission of the remaining portion of the first set of repetitions of the first uplink transmission when the second grant is determined to not indicate the HARQ-ACK for the first uplink transmission.

In Example 18, the method of any of Example 1 to Example 17 further includes that the remaining portion of the first set of repetitions are located after the determining that the second grant indicates the HARQ-ACK for the first uplink transmission and that the first set of allocated uplink resources overlaps with the second set of allocated uplink resources.

In Example 19, the method of any of Example 1 to Example 18 further includes: scheduling transmission of the first set of repetitions of the first uplink transmission.

Example 20 is a system or apparatus including means for implementing a method or realizing an apparatus as in any of Examples 1 to 19.

Example 21 is a device including one or more processors and one or more memories in electronic communication with the one or more processors storing instructions executable by the one or more processors to cause a system or an apparatus to implement a method as in any of Examples 1 to 19.

Example 22 is a non-transitory computer-readable medium storing instructions executable by one or more processors to cause the one or more processors to implement a method as in any of Examples 1 to 19.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first User Equipment (UE), comprising:
    receiving a first grant for a first set of allocated uplink resources;
    transmitting a first portion of a first set of repetitions of a first uplink transmission using the first set of allocated uplink resources;
    receiving a second grant for a second set of allocated uplink resources;
    determining whether the second grant indicates a Hybrid Automatic Repeat Request (HARQ) Acknowledgement (ACK) for the first uplink transmission, the determining whether the second grant indicates the HARQ-ACK for the first uplink transmission being based on whether the first set of allocated uplink resources overlaps with the second set of allocated uplink resources; and
    terminating transmission of a remaining portion of the first set of repetitions of the first uplink transmission after determining that the second grant indicates the HARQ-ACK for the first uplink transmission.

2. The method of claim 1, wherein determining whether the second grant indicates the HARQ-ACK for the first uplink transmission is further based on whether the second grant is a retransmission request of the first uplink transmission.

3. The method of claim 2, wherein determining whether the second grant is the retransmission request of the first uplink transmission is based on at least one of
- a first HARQ identifier (ID) of the first uplink transmission and a second HARQ ID of a second uplink transmission, or
- a first new data indicator of the first uplink transmission and a second new data indicator of the second uplink transmission.

4. The method of claim 1, wherein determining whether the second grant indicates the HARQ-ACK for the first uplink transmission is further based on at least one of
- a spacing in time between a beginning of the first uplink transmission and the second grant, or
- a spacing in time between the first grant and the second grant.

5. The method of claim 1, wherein determining whether the second grant indicates the HARQ-ACK for the first uplink transmission is further based on whether the first set of allocated uplink resources overlaps with the second set of allocated uplink resources in time.

6. The method of claim 1, further comprising:
receiving a configuration,
wherein determining whether the second grant indicates the HARQ-ACK for the first uplink transmission is further based on the configuration.

7. The method of claim 6, wherein the configuration comprises an indication of whether uplink HARQ-ACK feedback is supported.

8. The method of claim 7, wherein the second grant is determined to indicate the HARQ-ACK for the first uplink transmission when the configuration indicates that the uplink HARQ-ACK feedback is supported, and wherein the second grant is determined to not indicate the HARQ-ACK for the first uplink transmission when the configuration indicates that the uplink HARQ-ACK feedback is not supported.

9. The method of claim 1, further comprising:
terminating remaining repetitions of the first set of repetitions of the first uplink transmission in response to determining that the second grant indicates the HARQ-ACK for the first uplink transmission.

10. The method of claim 9, wherein transmitting the first portion of the first set of repetitions ends before a start of a second uplink transmission.

11. The method of claim 10, further comprising:
transmitting the second uplink transmission according to the second grant using a starting point based on an end point of the second grant.

12. The method of claim 10, further comprising:
transmitting the second uplink transmission according to the second grant using a starting point selected from a set of multiple starting points.

13. The method of claim 12, further comprising:
receiving signaling indicating the set of multiple starting points, wherein the signaling comprises at least one of system information, downlink control information, or radio resource control.

14. The method of claim 12, wherein the set of multiple starting points is based on a predefined set of starting points.

15. The method of claim 12, wherein the set of multiple starting points depends on at least one of a maximum repetition level of the second grant or an actual repetition level of the second grant.

16. The method of claim 10, further comprising:
sending an indication of the HARQ-ACK from a physical layer to a higher layer upon determining the second grant indicates the HARQ-ACK for the first uplink transmission.

17. The method of claim 1, further comprising:
refraining from terminating the transmission of the remaining portion of the first set of repetitions of the first uplink transmission when the second grant is determined to not indicate the HARQ-ACK for the first uplink transmission.

18. The method of claim 17, wherein the remaining portion of the first set of repetitions are located after determining that the second grant indicates the HARQ-ACK for the first uplink transmission and that the first set of allocated uplink resources overlaps with the second set of allocated uplink resources.

19. The method of claim 1, further comprising:
scheduling transmission of the first set of repetitions of the first uplink transmission.

20. An apparatus for wireless communication at a first User Equipment (UE), comprising:
means for receiving a first grant for a first set of allocated uplink resources;
means for transmitting a first portion of a first set of repetitions of a first uplink transmission using the first set of allocated uplink resources;
means for receiving a second grant for a second set of allocated uplink resources;
means for determining whether the second grant indicates a Hybrid Automatic Repeat Request (HARQ) Acknowledgement (ACK) for the first uplink transmission, the determining whether the second grant indicates the HARQ-ACK for the first uplink transmission being based on whether the first set of allocated uplink resources overlaps with the second set of allocated uplink resources; and
means for terminating transmission of a remaining portion of the first set of repetitions of the first uplink transmission after determining that the second grant indicates the HARQ-ACK for the first uplink transmission.

21. The apparatus of claim 20, further comprising:
means for receiving a configuration,
wherein the means for determining whether the second grant indicates the HARQ-ACK for the first uplink transmission is further based on the configuration.

22. The apparatus of claim 20, further comprising:
means for terminating remaining repetitions of the first set of repetitions of the first uplink transmission in response to determining that the second grant indicates the HARQ-ACK for the first uplink transmission.

23. The apparatus of claim 22, further comprising:
means for transmitting a second uplink transmission according to the second grant using a starting point based on an end point of the second grant, wherein transmission of the first set of repetitions ends before a start of a second uplink transmission.

24. The apparatus of claim 22, further comprising:
means for transmitting a second uplink transmission according to the second grant using a starting point selected from a set of multiple starting points, wherein transmission of the first set of repetitions ends before a start of a second uplink transmission.

25. The apparatus of claim 24, further comprising:
means for receiving signaling indicating the set of multiple starting points, wherein the signaling comprises at least one of system information, downlink control information, or radio resource control.

26. The apparatus of claim 22, further comprising:
means for sending an indication of the HARQ-ACK from a physical layer to a higher layer upon determining the second grant indicates the HARQ-ACK for the first uplink transmission, wherein transmitting the first portion of the first set of repetitions ends before a start of a second uplink transmission.

27. The apparatus of claim 20, further comprising:
means for refraining from terminating the transmission of the remaining portion of the first set of repetitions of the first uplink transmission when the second grant is determined to not indicate the HARQ-ACK for the first uplink transmission.

28. The apparatus of claim 20, further comprising:
means for scheduling transmission of the first set of repetitions of the first uplink transmission.

29. An apparatus for wireless communication at a first User Equipment (UE), comprising:
a memory; and
at least one processor coupled to the memory and coupled to:
receive a first grant for a first set of allocated uplink resources;
transmit a first portion of a first set of repetitions of a first uplink transmission using the first set of allocated uplink resources;
receive a second grant for a second set of allocated uplink resources;
determine whether the second grant indicates a Hybrid Automatic Repeat Request (HARQ) Acknowledgement (ACK) for the first uplink transmission, a determination of whether the second grant indicates the HARQ-ACK for the first uplink transmission being based on whether the first set of allocated uplink resources overlaps with the second set of allocated uplink resources; and
terminate transmission of a remaining portion of the first set of repetitions of the first uplink transmission after determining that the second grant indicates the HARQ-ACK for the first uplink transmission.

30. The apparatus of claim 29, wherein the at least one processor is further configured to determine whether the second grant indicates the HARQ-ACK for the first uplink transmission is further based on whether the second grant is a retransmission request of the first uplink transmission.

31. The apparatus of claim 30, wherein the at least one processor is further configured to determine whether the second grant is the retransmission request of the first uplink transmission based on at least one of
a first HARQ identifier (ID) of the first uplink transmission and a second HARQ ID of a second uplink transmission, or
a first new data indicator of the first uplink transmission and a second new data indicator of the second uplink transmission.

32. The apparatus of claim 29, wherein the at least one processor is further configured to determine whether the second grant indicates the HARQ-ACK for the first uplink transmission is further based on at least one of
a spacing in time between a beginning of the first uplink transmission and the second grant, or
a spacing in time between the first grant and the second grant.

33. The apparatus of claim 29, wherein the at least one processor is further configured to determine whether the second grant indicates the HARQ-ACK for the first uplink transmission is further based on whether the first set of allocated uplink resources overlaps with the second set of allocated uplink resources in time.

34. The apparatus of claim 29, wherein the at least one processor is further configured to:
receive a configuration; and
determine whether the second grant indicates the HARQ-ACK for the first uplink transmission based on the configuration.

35. The apparatus of claim 34, wherein the configuration comprises an indication of whether uplink HARQ-ACK feedback is supported.

36. The apparatus of claim 35, wherein the at least one processor is further configured to:
determine the second grant indicates the HARQ-ACK for the first uplink transmission when the configuration indicates that the uplink HARQ-ACK feedback is supported; and
determine the second grant does not indicate the HARQ-ACK for the first uplink transmission when the configuration indicates that the uplink HARQ-ACK feedback is not supported.

37. The apparatus of claim 29, wherein the at least one processor is further configured to:
terminate remaining repetitions of the first set of repetitions of the first uplink transmission in response to determining that the second grant indicates the HARQ-ACK for the first uplink transmission.

38. The apparatus of claim 37, wherein the at least one processor is further configured to end transmitting the first portion of the first set of repetitions before a start of a second uplink transmission.

39. The apparatus of claim 38, wherein the at least one processor is further configured to:
transmit the second uplink transmission according to the second grant using a starting point based on an end point of the second grant.

40. The apparatus of claim 38, wherein the at least one processor is further configured to:
transmit the second uplink transmission according to the second grant using a starting point selected from a set of multiple starting points.

41. The apparatus of claim 40, wherein the at least one processor is further configured to:
receive signaling indicating the set of multiple starting points, wherein the signaling comprises at least one of system information, downlink control information, or radio resource control.

42. The apparatus of claim 40, wherein the set of multiple starting points is based on a predefined set of starting points.

43. The apparatus of claim 40, wherein the set of multiple starting points depends on at least one of a maximum repetition level of the second grant or an actual repetition level of the second grant.

44. The apparatus of claim 38, wherein the at least one processor is further configured to:
send an indication of the HARQ-ACK from a physical layer to a higher layer upon determining the second grant indicates the HARQ-ACK for the first uplink transmission.

45. The apparatus of claim 29, wherein the at least one processor is further configured to:
refrain from terminating the transmission of the remaining portion of the first set of repetitions of the first uplink transmission when the second grant is determined to not indicate the HARQ-ACK for the first uplink transmission.

46. The apparatus of claim 45, wherein the remaining portion of the first set of repetitions are located after determining that the second grant indicates the HARQ-ACK for the first uplink transmission and that the first set of allocated uplink resources overlaps with the second set of allocated uplink resources.

47. The apparatus of claim 29, wherein the at least one processor is further configured to:
schedule transmission of the first set of repetitions of the first uplink transmission.

48. A non-transitory computer-readable medium storing computer executable code for wireless communication at a user equipment (UE), the code, when executed, cause a processor to:
receive a first grant for a first set of allocated uplink resources;
transmit a first portion of a first set of repetitions of a first uplink transmission using the first set of allocated uplink resources;
receive a second grant for a second set of allocated uplink resources;
determine whether the second grant indicates a Hybrid Automatic Repeat Request (HARQ) Acknowledgement (ACK) for the first uplink transmission, a determination of whether the second grant indicates the HARQ-ACK for the first uplink transmission being based on whether the first set of allocated uplink resources overlaps with the second set of allocated uplink resources; and
terminate transmission of a remaining portion of the first set of repetitions of the first uplink transmission after determining that the second grant indicates the HARQ-ACK for the first uplink transmission.

* * * * *